United States Patent
Shin et al.

(10) Patent No.: US 10,394,037 B2
(45) Date of Patent: Aug. 27, 2019

(54) GLASSES-FREE 3D DISPLAY MOBILE DEVICE, SETTING METHOD OF THE SAME, AND USING METHOD OF THE SAME

(71) Applicant: SAMSUNG ELECTRONICS CO., LTD., Suwon-si (KR)

(72) Inventors: Yoon-cheol Shin, Seongnam-si (KR); Won-jun Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/661,782

(22) Filed: Mar. 18, 2015

(65) Prior Publication Data

US 2015/0370079 A1    Dec. 24, 2015

Related U.S. Application Data

(60) Provisional application No. 62/013,836, filed on Jun. 18, 2014.

(30) Foreign Application Priority Data

Oct. 1, 2014  (KR) .................. 10-2014-0132660

(51) Int. Cl.
    *G02B 27/22*    (2018.01)
(52) U.S. Cl.
    CPC ................. *G02B 27/2214* (2013.01)
(58) Field of Classification Search
    CPC .... G02B 27/02; G02B 27/22; G02B 27/2207; G02B 27/2214; G02B 27/2221; G02B 27/2228; G02B 27/2242; G02B 27/225; G02B 21/22; G02B 27/2264; G02B 27/26; G02B 27/28; G02B 27/2257; H04N 13/04;

(Continued)

(56) References Cited

U.S. PATENT DOCUMENTS 8,902,300 B2    12/2014   Saito
2006/0050382 A1  3/2006   Jahrmarkt et al.
(Continued)

FOREIGN PATENT DOCUMENTS

AU    2012202610 A1    1/2013
EP     2597879 A2      5/2013
(Continued)

OTHER PUBLICATIONS

Communication dated Jun. 29, 2015 issued by the International Searching Authority in counterpart International Application No. PCT/KR2015/003544 (PCT/ISA/210/237).

(Continued)

*Primary Examiner* — Jade R Chwasz
(74) *Attorney, Agent, or Firm* — Sughrue Mion, PLLC

(57) ABSTRACT

Provided are a glasses-free three-dimensional (3D) display device, a setting method of the same, and a using method of the same. The glasses-free 3D display device includes: a display device including a flat panel display; and a 3D viewing cover detachably disposed on the flat panel display, the 3D viewing cover configured to allow images displayed on the flat panel display to be viewed in three dimensions, wherein the display device includes a cover setting program executable by the display device to set setting parameters of the 3D viewing cover.

17 Claims, 15 Drawing Sheets

(58) Field of Classification Search
CPC ........... H04N 13/0402; H04N 13/0404; H04N 13/0409; H04N 13/0422; H04N 13/0431; H04N 13/0434; H04N 13/0436; H04N 13/0438; H04N 13/0406; H04N 13/0415; H04N 13/0429; H04N 13/0459; H04N 13/0497
USPC .................. 359/462, 463, 464, 466, 477
See application file for complete search history.

(56) References Cited

U.S. PATENT DOCUMENTS

| | | | |
|---|---|---|---|
| 2009/0225154 A1* | 9/2009 | Raymond | H04N 13/0404 348/51 |
| 2010/0253768 A1* | 10/2010 | El-Maraghi | G06F 1/1609 348/51 |
| 2012/0017180 A1* | 1/2012 | Flik | G06F 3/0486 715/838 |
| 2012/0313840 A1 | 12/2012 | Tsutsui | |
| 2013/0058016 A1* | 3/2013 | Shi | G02B 3/005 361/679.01 |
| 2013/0187961 A1 | 6/2013 | Hunt | |
| 2013/0169529 A1* | 7/2013 | Ek | G02B 27/0093 345/156 |
| 2013/0194398 A1 | 8/2013 | Saito | |
| 2014/0015942 A1* | 1/2014 | Said | G02B 27/2214 348/59 |
| 2014/0098170 A1 | 4/2014 | Karszes et al. | |
| 2014/0152531 A1* | 6/2014 | Murray | G06F 1/1632 345/8 |
| 2014/0247329 A1 | 9/2014 | Nakamura et al. | |
| 2014/0354782 A1* | 12/2014 | Lowry | H04N 13/044 348/49 |

FOREIGN PATENT DOCUMENTS

| | | |
|---|---|---|
| EP | 2615838 A1 | 7/2013 |
| JP | 6-311536 A | 11/1994 |
| JP | 2004-4683 A | 1/2004 |
| JP | 2006-514340 A | 4/2006 |
| JP | 3127722 U | 12/2006 |
| JP | 2007-65441 A | 3/2007 |
| JP | 2011-107711 A | 6/2011 |
| JP | 2012-256988 A | 12/2012 |
| JP | 3181526 U | 2/2013 |
| JP | 2013-76716 A | 4/2013 |
| KR | 10-0491523 B1 | 5/2005 |
| KR | 10-2005-0089179 A | 9/2005 |
| KR | 10-2012-0079777 A | 7/2012 |
| KR | 10-1206750 B1 | 11/2012 |
| KR | 10-1227847 B1 | 1/2013 |
| WO | 2012/046655 A1 | 4/2012 |
| WO | 2012-134487 A1 | 10/2012 |
| WO | 2013/073028 A1 | 5/2013 |

OTHER PUBLICATIONS

Communication dated Nov. 22, 2017, from the European Patent Office in counterpart European Application No. 15809888.9.
Communication dated Feb. 23, 2018, issued by the European Patent Office in counterpart European application No. 15809888.9.
Communication dated Feb. 27, 2018, issued by the Japanese Patent Office in counterpart Japanese application No. 2016-572256.
Communication dated Jun. 17, 2019, issued by the State Intellectual Property Office of P.R. China in counterpart Chinese Application No. 201580033115.3.
Communication dated Jun. 27, 2019, issued by the European Patent Office in counterpart European Application No. 19155000.3.

* cited by examiner

GLASSES-FREE 3D DISPLAY MOBILE DEVICE, SETTING METHOD OF THE SAME, AND USING METHOD OF THE SAME

CROSS-REFERENCE TO RELATED APPLICATIONS

This application claims the benefit of U.S. Provisional Application No. 62/013,836, filed Jun. 18, 2014 in the United States Patent & Trademark Office, and claims priority from Korean Patent Application No. 10-2014-0132660, filed Oct. 1, 2014 in the Korean Intellectual Property Office, the disclosures of which are incorporated herein by reference in their entireties.

BACKGROUND

1. Field

Apparatuses and methods consistent with exemplary embodiments relate to a glasses-free three-dimensional (3D) display mobile device, and more particularly, a glasses-free 3D display mobile device using a 3D viewing cover in the form of removable accessory, a setting method of the same, and a using method of the same.

2. Description of the Related Art

Autostereoscopic three-dimensional (3D) displays allow a user to see three-dimensional images (namely, stereoscopic images) through a method of forming different viewing areas for a user's eyes by using a three-dimensional film, such as a parallax barrier, a lenticular lens, etc., without using a pair of 3D glasses.

Generally, a related art method for implementing the autostereoscopic three-dimensional display in mobile devices, such as smart phones, tablet computers, etc., includes a method of installing a three-dimensional film integrally within the display of the mobile device, and a method of forming the three-dimensional film as a device that can be detachable to the top surface of the display of the mobile device.

The method of installing the three-dimensional film integrally with the display of the mobile device installs the film only for three-dimensional images (3D images), and therefore has a problem that the image quality decreases when viewing two-dimensional images (2D images).

However, the method of forming the three-dimensional film to be detachable to the display of the mobile device can selectively view one of the three-dimensional image and the two-dimensional image so that the problem of the image quality of the two-dimensional image being decreased is resolved. However, the method has a problem that, whenever using the detachable film, a user must adjust a coupling between the three-dimensional film and the mobile device to be tailored to the user's own eyes in order to view an optimized three-dimensional image.

SUMMARY

Aspects of one or more exemplary embodiments overcome the above drawbacks and other problems associated with the related art methods. Aspects of one or more exemplary embodiments provides a glasses-free 3D display mobile device with a cover that can be removed from a display of the mobile device, and does not require another set-up process for later use after a first set-up is completed, a setting method of the same, and a using method of the same.

According to an aspect of an exemplary embodiment, there is provided a glasses-free three-dimensional (3D) display device including: a display device including a flat panel display; and a 3D viewing cover detachably disposed on the flat panel display, the 3D viewing cover configured to allow images displayed on the flat panel display to be viewed in three dimensions, wherein the display device includes a cover setting program executable by the display device to set setting parameters of the 3D viewing cover.

The 3D viewing cover may include: a cover frame configured to be coupled to the display device, the cover frame including an opening corresponding to the flat panel display in a center portion thereof; a buffer member around the opening on an inner surface of the cover frame; a three-dimensional film fixed to the inner surface of the cover frame by the buffer member, the three-dimensional film covering the opening; and a transparent plate between the cover frame and the three-dimensional film.

The 3D viewing cover may further include a double-sided tape configured to fix the buffer member to the cover frame.

The 3D viewing cover may further include a double-sided tape configured to fix the three-dimensional film to the buffer member.

The cover frame may include at least one hole around the opening, and the at least one hole may be at a position corresponding to an image capturing device of the display device.

When the 3D viewing cover is mounted on the display device, the buffer member may be compressed in a thickness direction of the buffer member, and when the 3D viewing cover is separated from the display device, a thickness of the buffer member may be expanded and restored to an original thickness.

The cover frame may include a fastening portion detachably coupled to the display device, and a distance between a leading end of the fastening portion and the three-dimensional film may be less than a thickness of the display device.

The 3D viewing cover may further include a secondary buffer member between the cover frame and the transparent plate.

The 3D viewing cover may be coupled to the display device by an elastic force.

The cover setting program may be configured to display a cover alignment pattern on the flat panel display of the display device.

The cover setting program may be configured so that, when the displayed cover alignment pattern is touched, one or more of the setting parameters of the 3D viewing cover are changed.

The setting parameters of the 3D viewing cover may include a slanted angle, a rendering pitch, and an offset of the three-dimensional film.

The cover setting program may be executable by the display device to set setting parameters of the 3D viewing cover on a per-user basis.

According to an aspect of another exemplary embodiment, there is provided a setting method of a glasses-free three-dimensional (3D) display device, the setting method including: executing a cover setting program in the display device for a 3D viewing cover mountable on the mobile device; displaying a cover alignment pattern image on the flat panel display of the display device based on an eye tracking operation for a face of a user; adjusting the cover alignment pattern image; and storing, in a storage of the display device, first setting parameters of the adjusted cover alignment pattern image.

The setting method may further include: receiving an input of design parameters of the 3D viewing cover into the cover setting program, wherein the displaying the cover alignment pattern image may include displaying the cover alignment pattern image on the flat panel display of the display device based on the eye tracking operation for the face of the user and based on the design parameters of the 3D viewing cover.

The displaying the cover alignment pattern image may include: determining a distance from the display device to eyes of the user by performing the eye tracking operation for the face of the user; obtaining the cover alignment pattern image based on design parameters of the 3D viewing cover and the determined distance from the display device to the eyes of the user; and displaying the obtained cover alignment pattern image on the flat panel display.

The design parameters may include a slanted angle, a rendering pitch, and an offset of the three-dimensional film of the 3D viewing cover.

The cover alignment pattern image displayed on the flat panel display may be movable by user input to change values of the first setting parameters.

The setting method may further include: re-executing the cover setting program in the display device; reading the first setting parameters stored in the storage of the display device; determining a distance between the display device and eyes of another user by performing the eye tracking operation for a face of the other user; obtaining a cover alignment pattern image based on the first setting parameters and the determined distance between the display device and the eyes of the other user; displaying the obtained cover alignment pattern image on the flat panel display; adjusting the displayed cover alignment pattern image; and storing, in the storage, second setting parameters of the adjusted cover alignment pattern image with an identifier corresponding to the other user.

The setting method may further include: re-executing the cover setting program in the display device; determining a distance between the display device and eyes of another user by performing the eye tracking operation for a face of the other user; obtaining a cover alignment pattern image based on the determined distance between the display device and the eyes of the other user; displaying the obtained cover alignment pattern image on the flat panel display; adjusting the displayed cover alignment pattern image; and storing, in the storage, second setting parameters of the adjusted cover alignment pattern image with an identifier corresponding to the other user.

According to an aspect of another exemplary embodiment, there is provided a non-transitory computer readable recording medium having recorded thereon a program executable by a computer for performing the above method.

According to an aspect of another exemplary embodiment, there is provided a using method of a glasses-free three-dimensional (3D) display device, the using method including: executing a 3D viewing program in the display device; reading setting parameters of the 3D viewing cover corresponding to a user selected for the 3D viewing program; determining a distance between the display device and eyes of the user after performing an eye tracking operation for a face of the user; performing 3D mapping for image data by using the read setting parameters and the determined distance between the display device and the eyes of the user; and outputting the 3D mapped image data to a flat panel display of the display device.

The setting parameters may include a slanted angle, a rendering pitch, and an offset of a three-dimensional film of the 3D viewing cover.

The eye tracking operation may use an image capturing device disposed in the display device.

The reading the setting parameters may include reading the setting parameters corresponding to the user from among a plurality of setting parameters stored in a per-user basis.

According to an aspect of another exemplary embodiment, there is provided a non-transitory computer readable recording medium having recorded thereon a program executable by a computer for performing the above method.

According to an aspect of another exemplary embodiment, there is provided a three-dimensional (3D) viewing cover for a display device configured to allow images displayed on the display device to be viewed in three dimensions, the 3D viewing cover including: a cover frame configured to be coupled to the display device, the cover frame including an opening corresponding to a display panel in a center portion thereof; a buffer member around the opening on an inner surface of the cover frame; a three-dimensional film fixed to the inner surface of the cover frame by the buffer member, the three-dimensional film covering the opening; and a transparent plate between the cover frame and the three-dimensional film.

The 3D viewing cover may further include a double-sided tape configured to fix the buffer member to the cover frame.

The 3D viewing cover may further include a double-sided tape configured to fix the three-dimensional film to the buffer member.

The cover frame may include at least one hole around the opening, and the at least one hole may be at a position corresponding to an image capturing device of the display device.

When the 3D viewing cover is mounted on the display device, the buffer member may be compressed in a thickness direction of the buffer member, and when the 3D viewing cover is separated from the display device, a thickness of the buffer member may be expanded and restored to an original thickness.

The cover frame may include a fastening portion detachable to the display device, and a distance between a leading end of the fastening portion and the three-dimensional film may be less than a thickness of the display device.

The 3D viewing cover may further include a secondary buffer member between the cover frame and the transparent plate.

According to an aspect of another exemplary embodiment, there is provided a glasses-free three-dimensional (3D) display device including: a display configured to display an image; a controller configured to execute a cover setting program to set a setting parameter for a 3D viewing cover that allows the image to be viewed in three dimensions; and a storage configured to store the setting parameter.

The cover setting program may be configured to display a cover alignment pattern on the display for adjusting the setting parameter.

The cover setting program may be configured so that, when the displayed cover alignment pattern is touched, the setting parameter of the 3D viewing cover is changed.

The setting parameter of the 3D viewing cover may include a slanted angle, a rendering pitch, or an offset of a three-dimensional film included in the 3D viewing cover.

The cover setting program may be executable by the controller to set setting parameters of the 3D viewing cover on a per-user basis.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EXEMPLARY EMBODIMENTS

Figure 1:
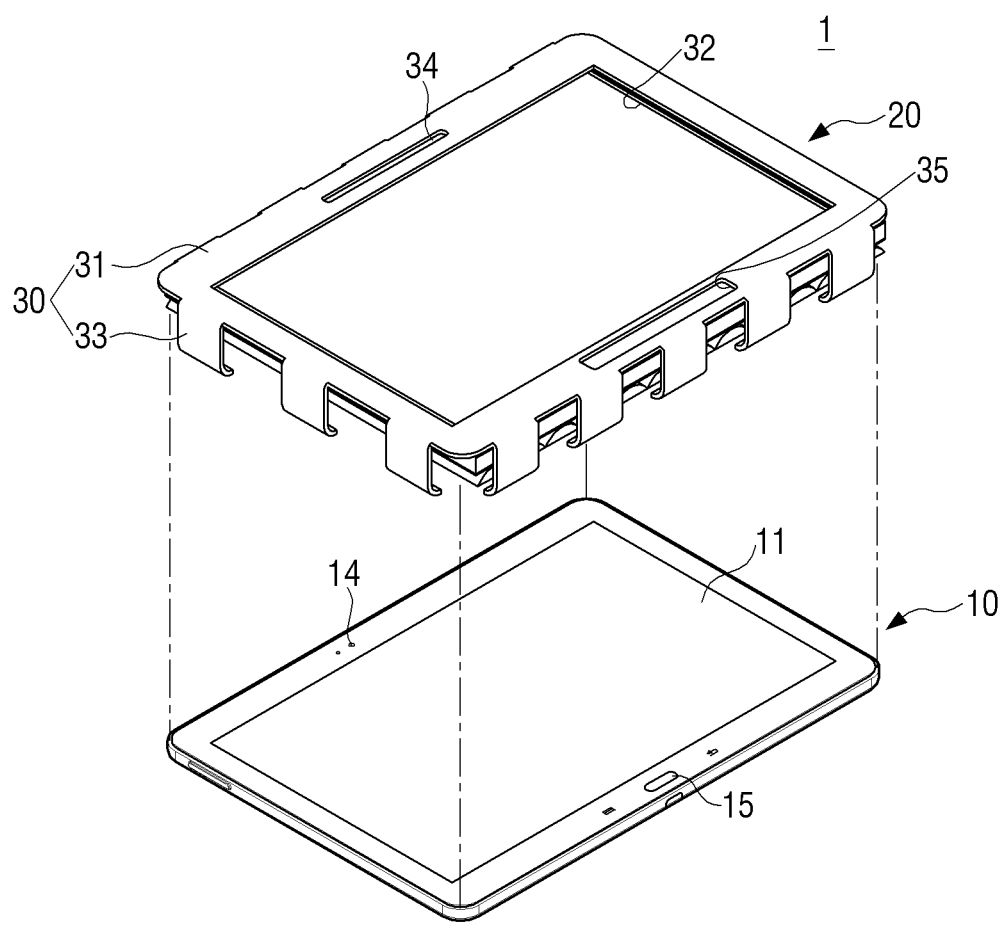
FIG. 1 is a perspective view illustrating a glasses-free 3D display mobile device according to an exemplary embodiment.

Hereinafter, exemplary embodiments will be described in detail with reference to the accompanying drawings. Throughout the drawings, like reference numerals will be understood to refer to like parts, components and structures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Hereinafter, expressions such as "at least one of," when preceding a list of elements, modify the entire list of elements and do not modify the individual elements of the list.

Figure 2:
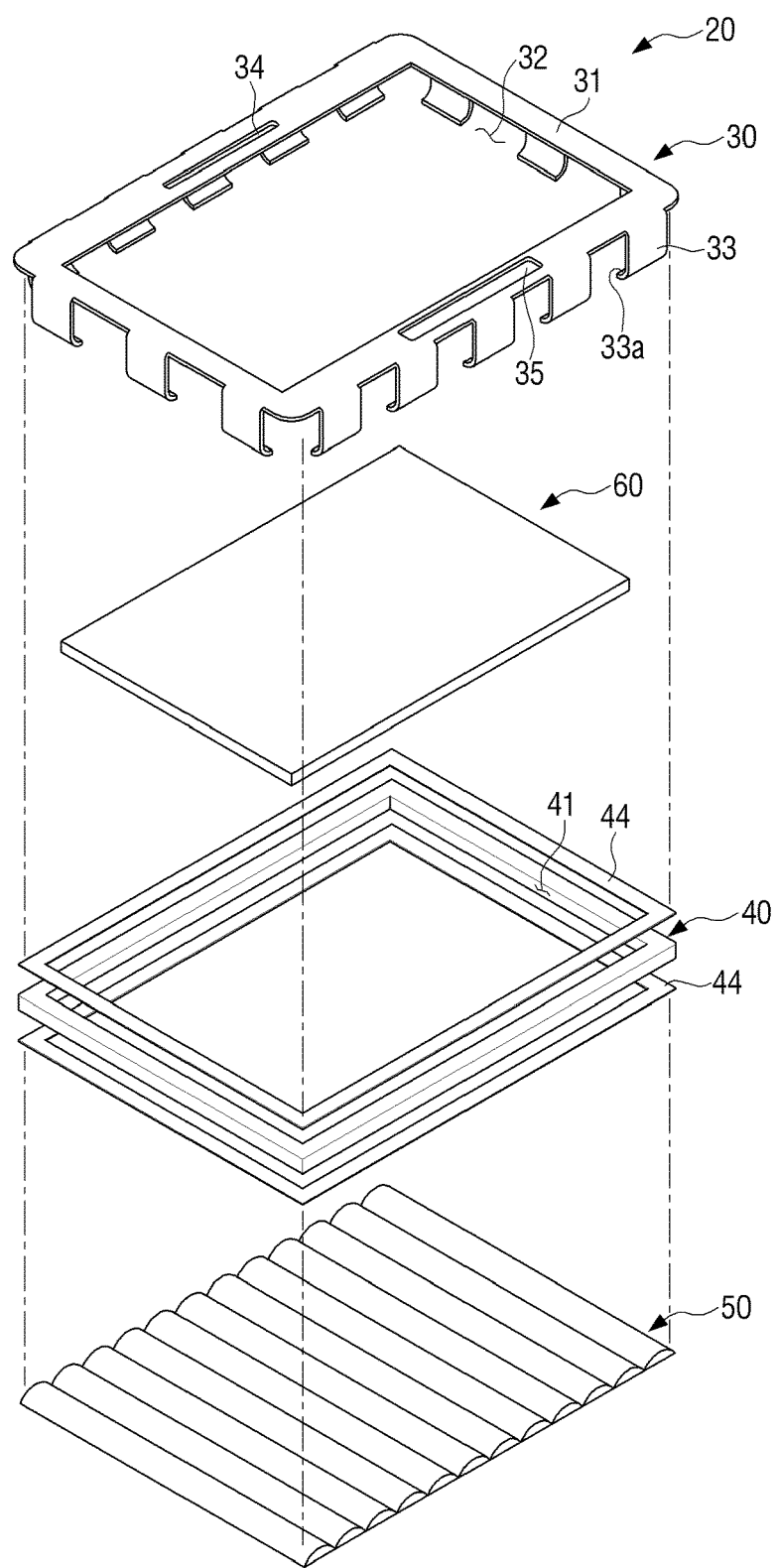
FIG. 2 is an exploded perspective view illustrating a 3D viewing cover used in a glasses-free 3D display mobile device according to an exemplary embodiment.
Figure 3:
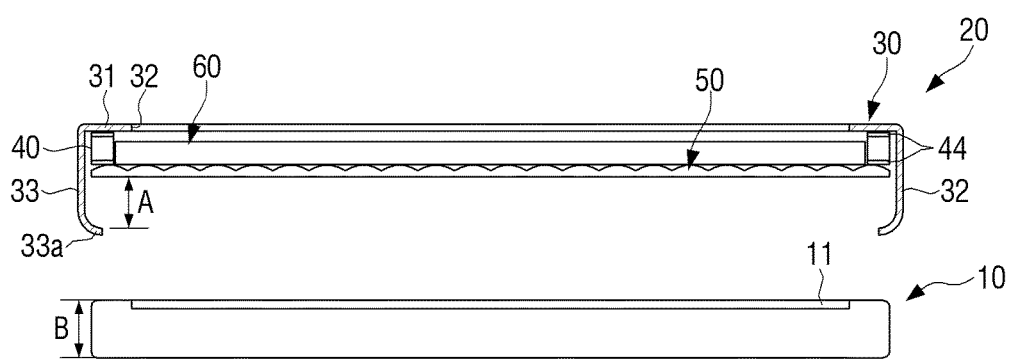
FIG. 3 is a cross-sectional view illustrating a glasses-free 3D display mobile device according to an exemplary embodiment before a 3D viewing cover is mounted on a mobile device.
Figure 4:
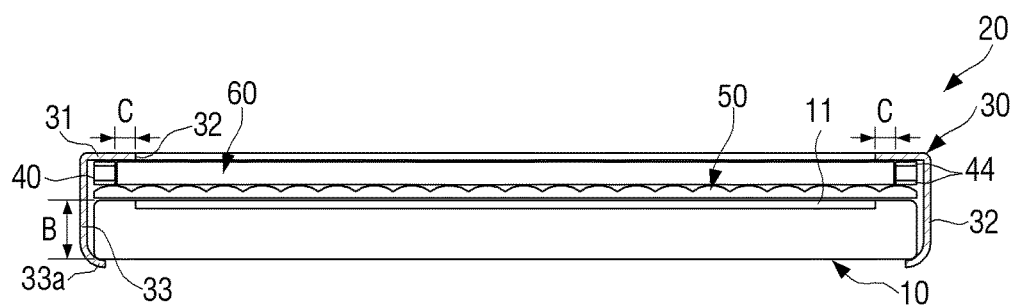
FIG. 4 is a cross-sectional view illustrating a glasses-free 3D display mobile device according to an exemplary embodiment after a 3D viewing cover is mounted on a mobile device.

FIG. 1 is a perspective view illustrating a glasses-free 3D display device (e.g., a glasses-free 3D display mobile device 1) according to an exemplary embodiment, and FIG. 2 is an exploded perspective view illustrating a 3D viewing cover 20 used in a glasses-free 3D display mobile device 1 according to an exemplary embodiment. FIG. 3 is a cross-sectional view illustrating a glasses-free 3D display mobile device 1 according to an exemplary embodiment before a 3D viewing cover 20 is mounted on a mobile device 10. FIG. 4 is a cross-sectional view illustrating a glasses-free 3D display mobile device 1 according to an exemplary embodiment after a 3D viewing cover 20 is mounted on a mobile device 10.

Referring to FIGS. 1 to 3, a glasses-free 3D display mobile device 1 according to an exemplary embodiment includes a mobile device 10 and a 3D viewing cover 20.

The mobile device 10 is provided with (i.e., includes) a flat panel display 11 where images are displayed, and a device (e.g., housing, frame, main body, etc.) that a user can carry. The mobile device 10 may include cellular phones, smart phones, tablet computers, notebook computers, netbook computers, e-book terminals, navigations, portable multimedia players (PMPs), digital multimedia broadcasting (DMB) terminals, personal digital assistants (PDAs), etc. The flat panel display 11 may include a touch screen.

Also, the mobile device 10 may include a controller and a storage unit (e.g., storage) which are disposed inside a main body. The controller controls the overall operation of the mobile device 10, and may output 2D images or 3D images to the flat panel display 11. In addition, the controller controls the mobile device 10 according to user commands inputted by an input unit such as a touch screen.

The storage unit stores various data such as 2D images, 3D images, etc. Various application programs that can be controlled by the controller may be installed in the storage unit. The controller may be configured by a variety of memories. Accordingly, a cover setting program for setting the 3D viewing cover 20 according to preferences of the user and a 3D viewing program used to view 3D images using the 3D viewing cover 20 may be installed in the mobile device 10. These programs will be described in detail below. In addition, the controller and the storage unit of the mobile device 10 according to an exemplary embodiment may be the same as or similar to the controller and the storage unit of a related mobile device.

The 3D viewing cover 20 is detachably mounted onto a top surface of the flat panel display 11 of the mobile device 10. If the 3D viewing cover 20 is mounted onto the mobile device 10, the user can view in three dimensions the image that is being displayed on the flat panel display 11. Also, if the 3D viewing cover 20 is removed from the mobile device 10, the user can view a 2D image that is being displayed on the flat panel display 11 with no image degradation.

Referring to FIGS. 2 and 3, the 3D viewing cover 20 may include a cover frame 30, a buffer member 40, a three-dimensional film 50, and a transparent plate 60.

The cover frame 30 is formed (e.g., provided) to be coupled to the mobile device 10, and is provided with an opening 32 which corresponds to the size and shape of the flat panel display 11 of the mobile device 10 in a center portion of the cover frame 30. The cover frame 30 may be configured to be coupled elastically to a housing constituting the main body of the mobile device 10 and supports the flat panel display 11. The cover frame 30 includes a frame portion 31 formed to have a size corresponding to the front surface of the mobile device 10, that is, one surface of the mobile device 10 in which the flat panel display 11 is disposed and provided with the opening 32 corresponding to the flat panel display 11. The cover frame 30 further includes a fastening portion 33 that allows the cover frame 30 to be detachably coupled to the mobile device 10.

The frame portion 31 may be formed of a rigid body that stably supports the three-dimensional film 50 and is difficult to deform. Also, the frame portion 31 of the cover frame 30 may be provided with at least one hole 34 and 35 formed around the opening 32. The at least one hole 34 and 35 may be formed, for example, at a position corresponding to a lens portion of an image capturing device (e.g., a camera unit 14 or a camera) that is exposed on the front surface of the mobile device 10 or a home button 15 of the mobile device 10 around the frame portion 31.

The fastening portion 33 may be formed of (e.g., include) an elastic material. The fastening portion 33 may be formed to project from four sides of the frame portion 31 substantially perpendicular to the frame portion 31 and to be coupled to the bottom surface of the housing of the mobile device 10 by the elastic force. Accordingly, if the user applies a certain force to a front or leading end 33a of the fastening portion 33 that presses the bottom surface of the mobile device 10, the fastening portion 33 may be separated from the mobile device 10. If the fastening portion 33 is separated from the mobile device 10, the cover frame 30 may be removed from the mobile device 10. At least one fastening portion 33 may be formed on each of the four sides of the frame portion 31. In the present exemplary embodiment, as illustrated in FIGS. 1 and 2, a plurality of fastening portions 33 are formed on each of the four sides of the frame portion 31. In the present exemplary embodiment, the fastening portion 33 is formed of an elastic material so that the cover frame 30 is disposed on the mobile device 10 by the elastic force. However, it is understood that one or more other exemplary embodiments are not limited thereto. The fastening portion 33 may be configured in a variety of methods as long as the fastening portion 33 fixes the cover frame 30 to the mobile device 10 such that the cover frame 30 may be stabilized, held, or prevented from moving. For example, the fastening portion 33 according to another exemplary embodiment secures the cover frame 30 to the mobile device 10 by using a screw fastening. Additionally, while in the present exemplary embodiment the fastening portion 33 is provided on all four sides of the frame portion 31, it is understood that one or more other exemplary embodiments are not limited thereto. For example, according to one or more other exemplary embodiments, the fastening portion 33 may be provided on one or some, but not all, sides of the frame portion 31.

The buffer member 40 may be disposed around the opening 32 on the inner surface of the cover frame 30. The buffer member 40 is formed of an elastic member, the thickness of which decreases when a force is applied in a vertical direction, namely, in the direction of the thickness of the buffer member 40, and which is restored to its original state when the force is removed. The buffer member 40 is fixed to the bottom surface of the frame portion 31 of the cover frame 30. The buffer member 40 may be fixed to the frame portion 31 of the cover frame 30 by double-sided tape, adhesive, or the like. In the present exemplary embodiment, as illustrated in FIGS. 2 and 3, the buffer member 40 is fixed to the frame portion 31 of the cover frame 30 by double-sided tape 44. The buffer member 40 is formed to have a size that is not exposed to the opening 32 of the cover frame 30. Considering, for example, the transparent plate 60 to be described below, the width of the buffer member 40 may be formed narrower than the width of the frame portion 31. The buffer member 40 may serve to absorb a manufacturing error of the cover frame 30 and the mobile device 10.

The three-dimensional film 50 allows a user to see a stereoscopic image, namely, a three-dimensional image by forming different viewing areas for user's eyes. A parallax barrier, a lenticular lens, or the like may be used as the three-dimensional film 50.

The three-dimensional film 50 is formed of a size that can cover the flat panel display 11 of the mobile device 10 and is fixed to the buffer member 40. In detail, one surface of the buffer member 40 is fixed to the inner surface of the cover frame 30, and the three-dimensional film 50 is fixed to the other surface of the buffer member 40. Accordingly, the three-dimensional film 50 is fixed to the inside of the cover frame 30 by the buffer member 40, and covers the opening 32 of the cover frame 30. Therefore, when the cover frame 30 is fixed to the mobile device 10, the three-dimensional film 50 is in contact with the top surface of the flat panel display 11 of the mobile device 10, and when the cover frame 30 is separated from the mobile device 10, the three-dimensional film 50 is removed from the mobile device 10. The three-dimensional film 50 may be fixed to the buffer member 40 by double-sided tape, adhesive, or the like. In the present exemplary embodiment, the three-dimensional film 50 is fixed to the buffer member 40 by double-sided tape 44.

The transparent plate 60 is disposed in a space between the frame portion 31 of the cover frame 30 and the three-dimensional film 50, and presses the three-dimensional film 50 against the flat panel display 11 of the mobile device 10. In detail, when the cover frame 30 is mounted onto the mobile device 10, the frame portion 31 of the cover frame 30 presses the margin of the transparent plate 60. As a result, the three-dimensional film 50 is in close contact with the flat panel display 11 of the mobile device 10 as a result of pressure from the transparent plate 60. A distance (A in FIG. 3) between the leading end 33a of the fastening portion 33 of the cover frame 30 and the bottom surface of the three-dimensional film 50 is formed to be smaller than the thickness (B in FIG. 3) of the mobile device 10. Also, the transparent plate 60 is formed to have a size larger than the size of the opening 32. The contact width (C in FIG. 4) between the transparent plate 60 and the frame portion 31 of the cover frame 30 may be determined such that the frame portion 31 of the cover frame 30 can apply a force evenly to the whole transparent plate 60. Also, the thickness of the transparent plate 60 may be determined such that, when the cover frame 30 is coupled to the mobile device 10, the frame portion 31 of the cover frame 30 is enough to press the transparent plate 60.

Figure 5:
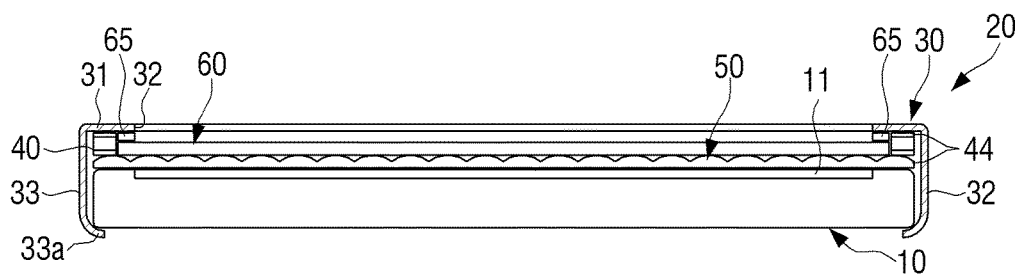
FIG. 5 is a cross-sectional view illustrating a glasses-free 3D display mobile device according to an exemplary embodiment with another 3D viewing cover.

According to another exemplary embodiment, as illustrated in FIG. 5, a secondary buffer member 65 may be disposed between the top surface of the transparent plate 60 and the frame portion 31 of the cover frame 30. When the cover frame 30 is mounted onto the mobile device 10, the secondary buffer member 65 is pressed by the transparent plate 60, and when the cover frame 30 is removed from the mobile device 10, the secondary buffer member 65 is restored to an original state. The secondary buffer member 65 is formed to have a width smaller than the contact width C (see FIG. 4) of the transparent plate 60. Accordingly, the secondary buffer member 65 does not interfere with viewing three-dimensional images through the three-dimensional film 50. The secondary buffer member 65 may be fixed to the perimeter of the opening 32 of the frame portion 31 of the cover frame 30. Accordingly, when the cover frame 30 is not mounted onto the mobile device 10, the secondary buffer member 65 may prevent the transparent plate 60 from moving between the three-dimensional film 50 and the frame portion 31 of the cover frame 30. Also, the transparent plate 60 may be disposed so as to be fixed to the secondary buffer member 65.

Accordingly, when the 3D viewing cover 20 is mounted onto the mobile device 10, the three-dimensional film 50 is positioned on the upper side of the flat panel display 11 of the mobile device 10. Therefore, the user can view three-dimensional images being displayed on the flat panel display 11 of the mobile device 10. At this time, since the three-dimensional film 50 is in close contact with the flat panel display 11 of the mobile device 10 due to the buffer member 40 and the transparent plate 60 of the 3D viewing cover 20, even if there are manufacturing tolerances in the mobile device 10 and the 3D viewing cover 20, the three-dimensional film 50 of the 3D viewing cover 20 may always be in close contact with the flat panel display 11 of the mobile device 10 when mounted on the mobile device 10.

In the above description, the 3D viewing cover 20 is configured in the shape of a top cover that can be removably mounted onto the top surface of the mobile device 10. However, it is understood that the shape of the 3D viewing cover 20 is not limited thereto in one or more other exemplary embodiment. The 3D viewing cover 20 may be configured in a variety of forms to be detachably disposed on the mobile device 10.

Even if the 3D viewing cover 20 is configured in the form of a top cover as shown in the above-described exemplary embodiment, the 3D viewing cover 20 may be formed to be mounted onto both the front surface (a surface where the flat panel display 11 is disposed) and the back surface of the mobile device 10. In this case, when viewing the three-dimensional images, the 3D viewing cover 20 may be mounted onto the front surface of the mobile device 10, and when not viewing the three-dimensional images, the 3D viewing cover 20 may be mounted onto the rear surface of the mobile device 10.

Figure 6:
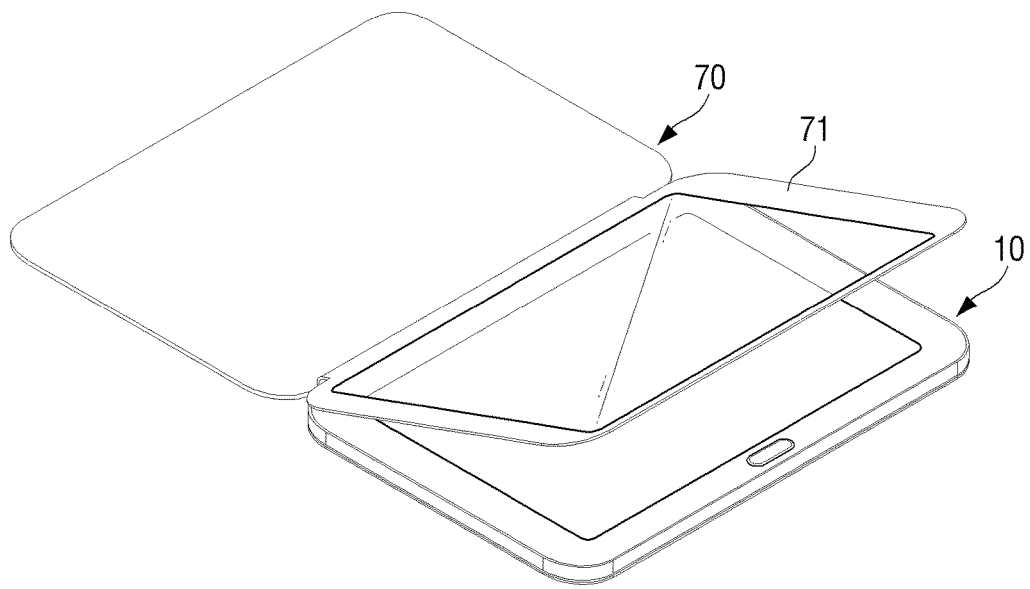
FIG. 6 is a perspective view illustrating a 3D viewing cover usable with a glasses-free 3D display mobile device according to an exemplary embodiment formed as a flip case.

According to another exemplary embodiment, as illustrated in FIG. 6, the 3D viewing cover may be formed in the shape of a flip case. A flip case 70 as illustrated in FIG. 6 is formed such that a three-dimensional film 71 is installed in the middle of the flip case 70, and, when viewing three-dimensional images, the three-dimensional film 71 is covered and fixed to the flat panel display of the mobile device 10. According to one or more other exemplary embodiments, the flip case 70 may additionally include one or more fastening portions (such as those described above with reference to FIGS. 1 to 5) on each of one or more sides of a frame portion of the 3D film 71. Additionally, the viewing cover 20 as illustrated in any one of FIGS. 1 to 5 (or further modified, e.g., to include no fastening portions 33 or fastening portions 33 on less than all four sides of the frame portion 31) may be implemented as a flip cover alone (e.g., similar to flip cover 80 of FIG. 8) or may be implemented in the flip case 70 of the exemplary embodiment of FIG. 7 in place of the 3D film 71.

Figure 7:
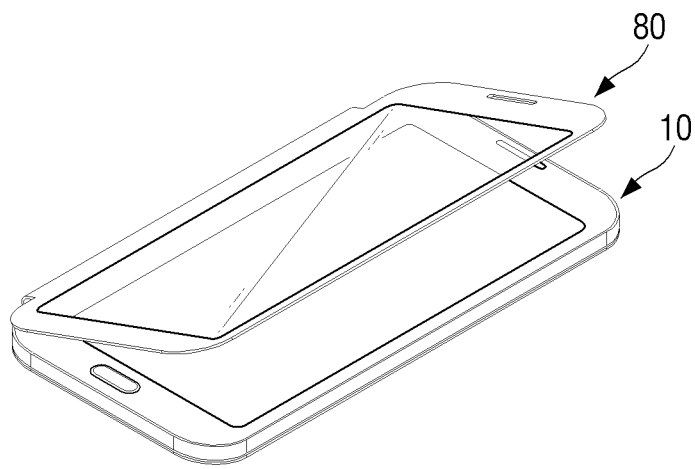
FIG. 7 is a perspective view illustrating a 3D viewing cover usable with a glasses-free 3D display mobile device according to an exemplary embodiment formed as a flip cover.

According to another exemplary embodiment, as illustrated in FIG. 7, the 3D viewing cover may be formed in the shape of a flip cover 80. A flip cover 80 is formed such that a three-dimensional film is attached to the flip cover 80, and, when the mobile device 10 is covered by the flip cover 80, a user can view three-dimensional images being displayed on the flat panel display of the mobile device 10.

A cover setting program is installed and executed by a controller of the mobile device 10, and allows settings for the 3D viewing cover 20 to be set according to each user. Users who use the 3D viewing cover 20 for the first time may initially (and not again thereafter) configure the settings for the 3D viewing cover 20 in order to achieve the optimum performance of the 3D viewing cover 20. At this time, the cover setting program executed by the controller of the mobile device 10 is used. The mobile device 10 and the 3D viewing cover 20 have a predetermined range of manufacturing tolerances. In particular, the 3D viewing cover 20 may have different design parameters due to the nature of the three-dimensional film 50, respectively. The design parameters of the 3D viewing cover 20 may include a slanted angle, a rendering pitch, an offset, etc., of the three-dimensional film 50.

Accordingly, the cover setting program may provide an input window for inputting and storing the design parameters of the 3D viewing cover 20 in the storage unit of the mobile device 10.

Also, the cover setting program may calculate a distance D (see FIG. 9) between the mobile device 10 and a user's eyes by controlling a camera unit 14 disposed in the mobile device 10 to perform eye tracking of the user's eyes. The eye tracking may refer to a method that recognizes the user's face from an image taken with the camera unit 14 disposed in the front surface of the mobile device 10, and recognizes a position value of the user's eyes from the user's face. Accordingly, if the position value of the user's eye is known, the cover setting program can calculate the distance between the mobile device 10 and the user's eyes. The eye tracking can use a related art method.

Figure 10A:
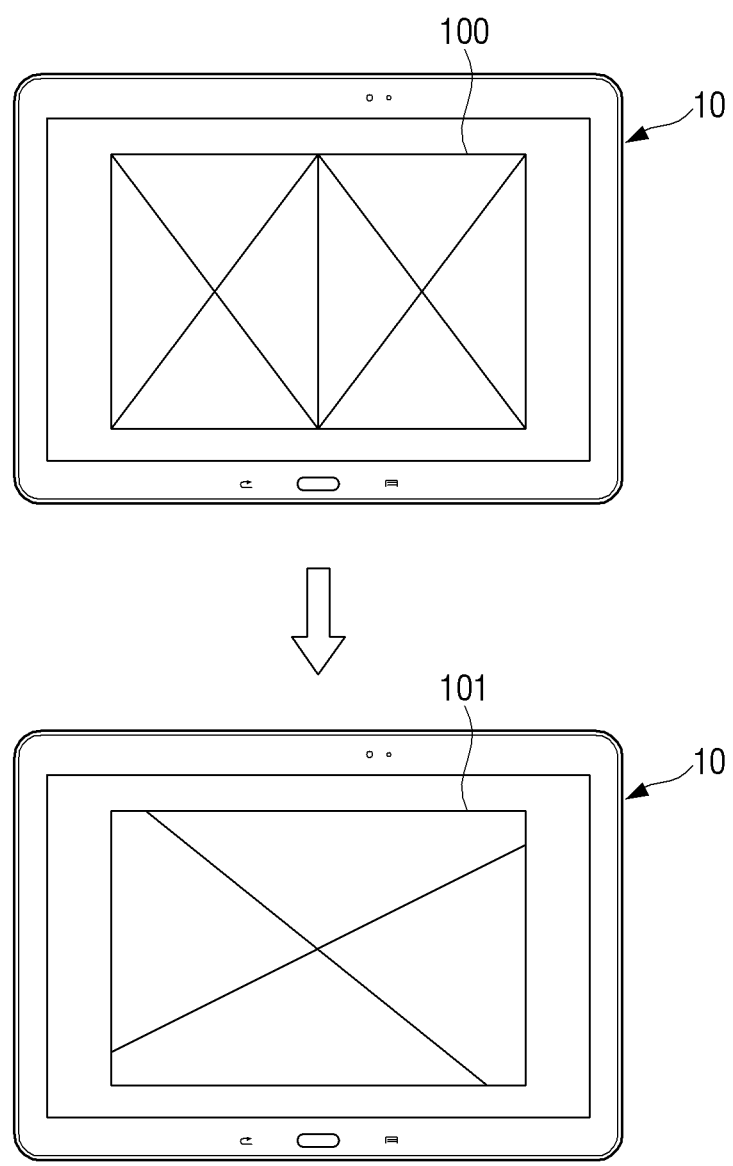
FIGS. 10A, 10B, and 10C are views illustrating cover alignment patterns which are displayed on a glasses-free 3D display mobile device when performing a setting method of the glasses-free 3D display mobile device according to an exemplary embodiment.
Figure 10B:
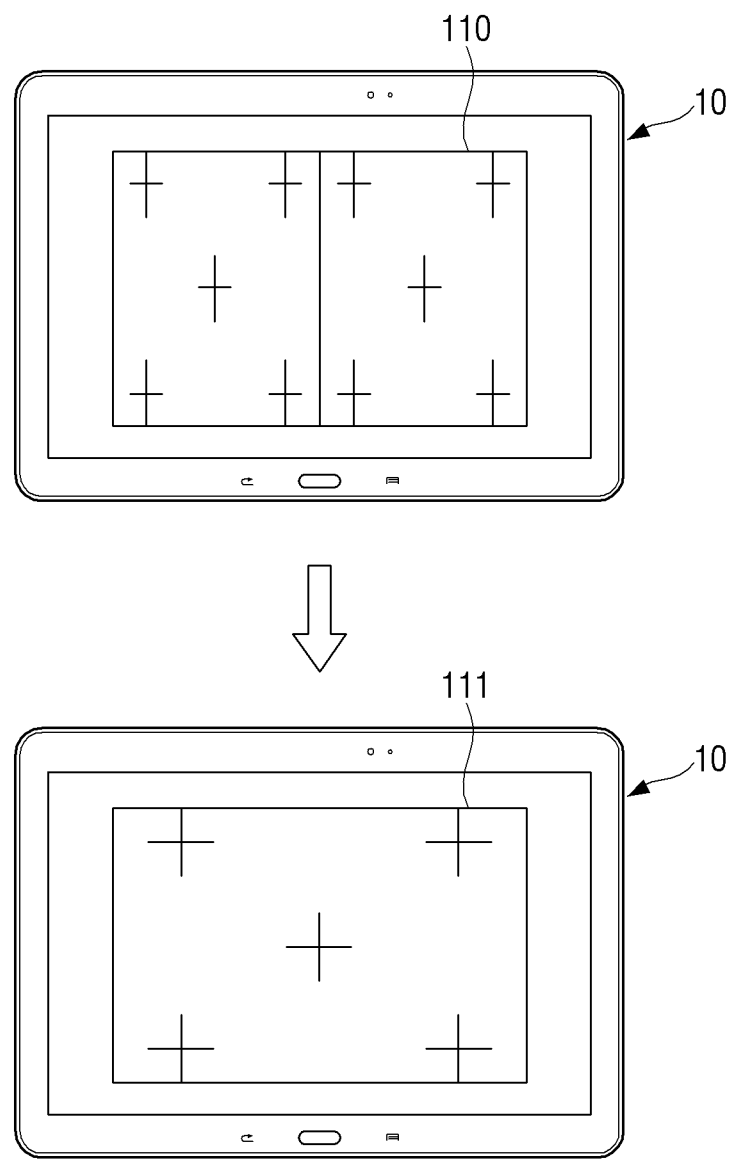
Figure 10C:
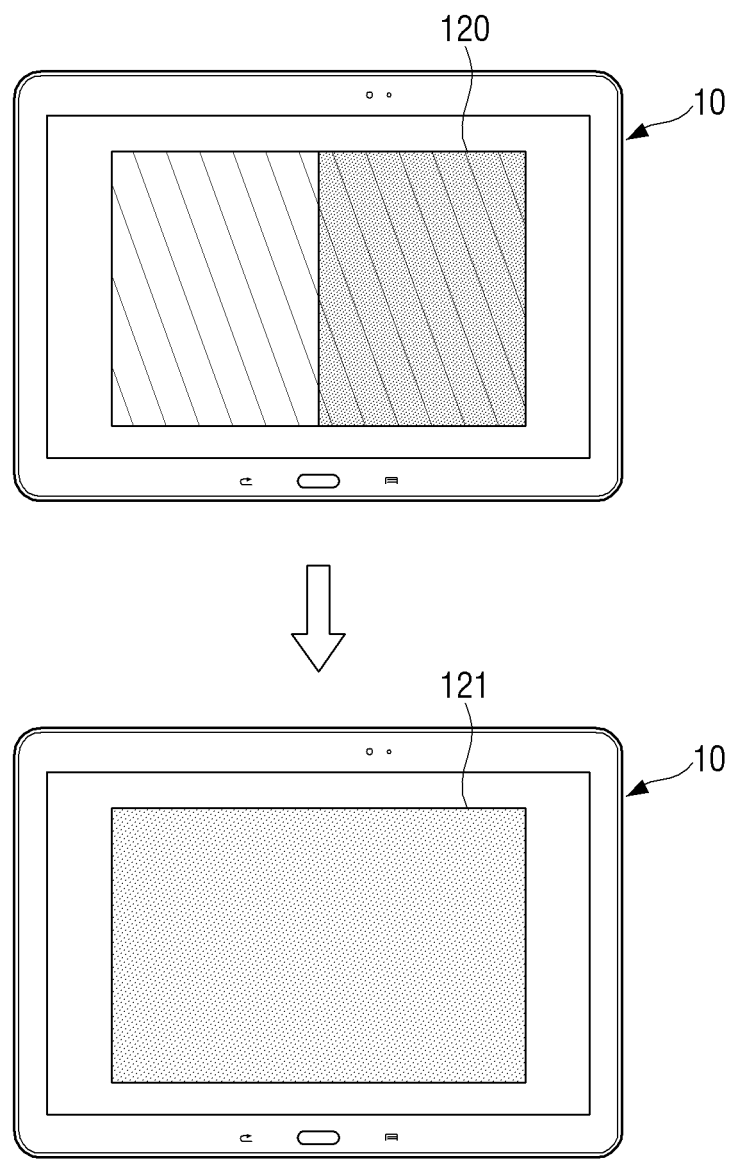

The cover setting program forms cover alignment patterns, and displays the cover alignment patterns on the flat panel display 11 of the mobile device 10. The cover setting program can generate various shapes of cover alignment patterns as illustrated in FIGS. 10A, 10B, and 10C. The cover setting program forms or obtains cover alignment patterns that a user can recognize as a three-dimensional image by using the distance between the mobile device 10 and the user's eyes calculated through the eye tracking and the input design parameters of the 3D viewing cover 20, and then, outputs the cover alignment patterns to the flat panel display 11 of the mobile device 10. At this time, since the design parameters that the cover setting program uses to form the cover alignment patterns are changed according to the distance D between the mobile device 10 and the user's eyes, the setting parameters of the cover alignment patterns, e.g., the slanted angle, the rendering pitch, the offset, etc., used for forming the cover alignment patterns are different from the design parameters of the 3D viewing cover 20. The cover setting program is configured to store the setting parameters of the cover alignment patterns in the storage unit of the mobile device 10.

Also, the cover setting program may be configured such that, when the user performs an input for changing or modifying the displayed cover alignment patterns (e.g., when the user touches the cover alignment patterns displayed on the flat panel display 11 of the mobile device 10 so as to be changed), the setting parameters of the cover alignment patterns are changed.

Accordingly, when first using the 3D viewing cover 20 according to an exemplary embodiment, the user can set the 3D viewing cover 20 in accordance with the user's own preferences by using the cover setting program installed in the mobile device 10.

Subsequently, even if the user separates the 3D viewing cover 20, and then re-mounts the 3D viewing cover 20 onto the mobile device 10 in order to use the mobile device 10, the mobile device 10 outputs three-dimensional images using the setting parameters and the distance between the mobile device 10 and the user's eyes calculated by using the eye tracking so that the user can view the three-dimensional images without additional settings being input for the 3D viewing cover 20.

Hereinafter, a setting method of a glasses-free 3D display mobile device according to an exemplary embodiment will be described in detail with reference to FIGS. 8, 9, and 10A to 10C.

Figure 8:
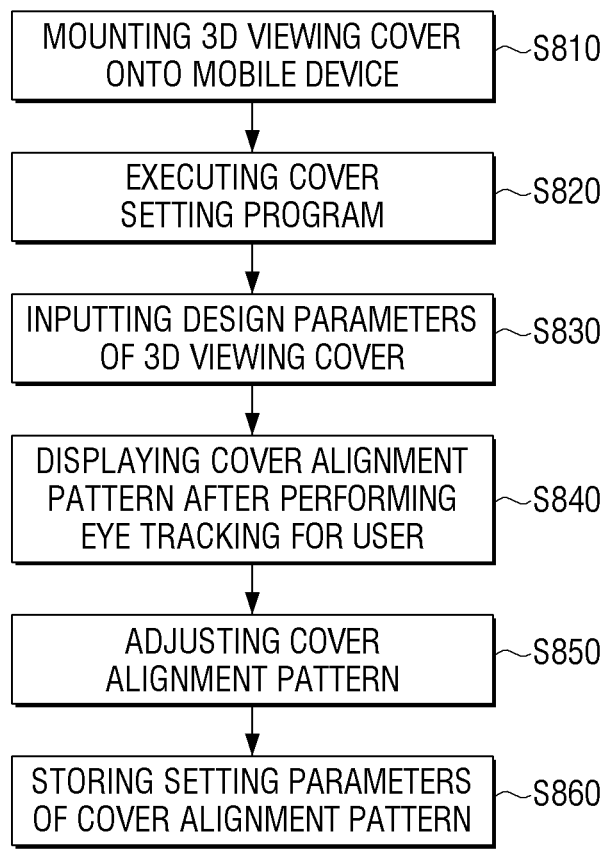
FIG. 8 is a flowchart for explaining a setting method of a glasses-free 3D display mobile device according to an exemplary embodiment in which a 3D viewing cover is mounted onto the glasses-free 3D display mobile device and is set.
Figure 9:
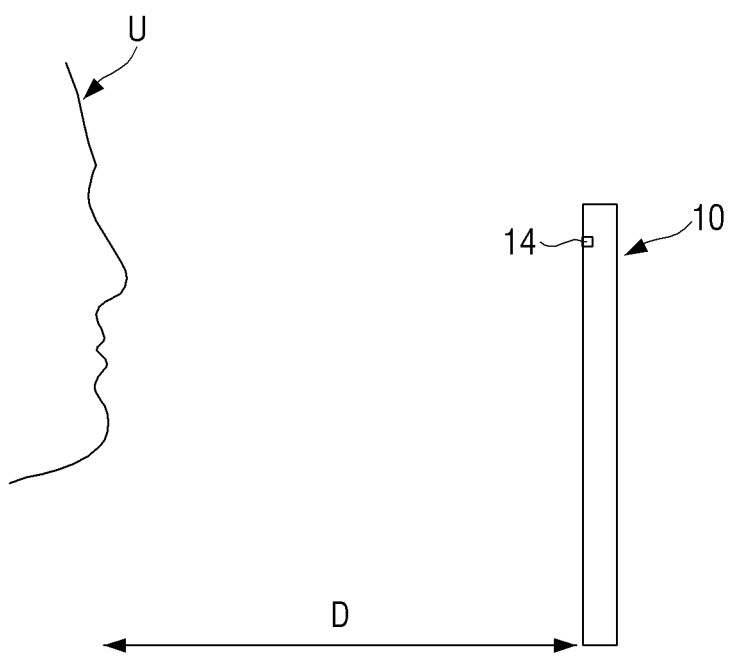
FIG. 9 is a view illustrating a location relationship between a user and a glasses-free 3D display mobile device when performing a setting method of the glasses-free 3D display mobile device according to an exemplary embodiment.

FIG. 8 is a flowchart for explaining a setting method of a glasses-free 3D display mobile device 1 according to an exemplary embodiment after a 3D viewing cover 20 is mounted onto the glasses-free 3D display mobile device 1. FIG. 9 is a view illustrating a location relationship between a user and a glasses-free 3D display mobile device 1 when performing a setting method of the glasses-free 3D display mobile device 1 according to an exemplary embodiment. FIGS. 10A, 10B, and 10C are views illustrating cover alignment patterns which are displayed on a glasses-free 3D display mobile device 1 when performing a setting method of the glasses-free 3D display mobile device 1 according to an exemplary embodiment.

The setting method of the glasses-free 3D display mobile device 1 according to an exemplary embodiment may include a cover mounting operation for mounting the 3D viewing cover 20 onto the mobile device 10, a parameter setting operation for determining the setting parameters of the 3D viewing cover 20 based on a user, and a storing operation for storing the setting parameters of the 3D viewing cover 20 in the mobile device 10.

Hereinafter, operations of the setting method of the glasses-free 3D display mobile device will be described in detail with reference to FIG. 8.

Referring to FIG. 8, a user mounts a 3D viewing cover 20 to be used onto the mobile device 10 (operation S810). At this time, since the 3D viewing cover 20 is provided with an elastic fastening portion 33, the 3D viewing cover 20 may be detachably mounted onto the mobile device 10. When the 3D viewing cover 20 is mounted on the mobile device 10, the three-dimensional film 50 is in close contact with the flat panel display 11 of the mobile device 10.

The user performs the parameter setting operation. In detail, the user executes the cover setting program installed in the controller of the mobile device 10 (operation S820). The cover setting program is provided with the 3D viewing cover 20, and may be configured to be installed in the mobile device 10 by the user, a service provider, a manufacturer, etc.

The user inputs the design parameters of the 3D viewing cover 20 mounted on the mobile device 10 into the cover setting program (operation S830). For example, the cover setting program may output an input window through which the user can selectively input the design parameters of the 3D viewing cover 20 to the flat panel display 11 of the mobile device 10. In this case, the user may input the design parameters of the 3D viewing cover 20 by touching the flat panel display 11 composed of a touch screen, by manipulating physical buttons on the mobile device 10, by inputting a gesture or voice input, etc. The cover setting program may store the input design parameters in the storage unit of the mobile device 10. The design parameters of the 3D viewing cover 20 may be provided with the 3D viewing cover 20.

The cover setting program performs the eye tracking for the user's face, and displays cover alignment patterns on the flat panel display 11 of the mobile device 10 according to the eye tracking (operation S840).

The operation of displaying cover alignment patterns includes calculating a distance from the mobile device 10 to the user's eyes by performing the eye tracking for the user's face, generating cover alignment patterns by using the distance from the mobile device 10 to the user's eyes and the design parameters of the 3D viewing cover 20 inputted by the user, and displaying the generated cover alignment patterns on the flat panel display 11.

In the operation of calculating a distance from the mobile device 10 to the user's eyes, the cover setting program controls the camera unit 14 of the mobile device 10 to perform the eye tracking. The eye tracking photographs or captures an image of a user to form a user's image, recognizes a user's face U from the photographed user's image, and calculates a position value of the user's eyes from the recognized user's face U. Then, the cover setting program calculates the distance D between the mobile device 10 and the user's eyes as illustrated in FIG. 9 by using the position value of the user's eyes.

In the operation of generating cover alignment patterns and displaying the generated cover alignment patterns on the flat panel display 11, the cover setting program generates a cover alignment pattern image using the distance D between the mobile device 10 and the user's eyes calculated in the previous operation and the design parameters of the 3D viewing cover 20 inputted by the user as a reference. According to another exemplary embodiment, the cover setting program may obtain the cover alignment pattern images from among pre-stored pattern images that are previously stored in the mobile device 10 or in an external device. At this time, the cover setting program may output various types of cover alignment pattern images to the flat panel display 11. Examples of the cover alignment pattern image are illustrated in FIGS. 10A, 10B, and 10C.

The cover setting program forms a pattern image for the left eye and a pattern image for the right eye 100, and displays the pattern image for the left eye and the pattern image for the right eye 100 on the flat panel display 11 of the mobile device 10. If the setting parameters of the cover alignment patterns are optimized to or set for the user's eyes, the user can view the cover alignment pattern image that is illustrated at the bottom of FIG. 10A in a three-dimensional form through the 3D viewing cover 20. For reference, the image that is illustrated at the top of FIG. 10A is not an actual image that is output through the flat panel display 11 of the mobile device 10 and which the user can see, but is a virtual image of the pattern image for the left eye and the pattern image for the right eye 100 formed by the cover setting program.

If the cover alignment pattern image that the user views through the 3D viewing cover 20 is not viewed clearly (e.g., if lines are disconnected), unlike the figure as illustrated at the bottom of FIG. 10A, the user may adjust the cover alignment pattern image (operation S850). If the separation of the pattern image for the left eye and the pattern image for the right eye is inaccurate and cross-talk occurs, the cover alignment pattern image is not viewed clearly unlike the figure as illustrated at the bottom of FIG. 10A. In this case, the user may adjust the cover alignment pattern image 101 so as to be seen clearly like the figure as illustrated at the bottom of FIG. 10A by touching the cover alignment pattern image 101 that is seen through the 3D viewing cover 20 so that the cover alignment pattern image 101 is moved or rotated.

FIGS. 10B and 10C illustrate a cover alignment pattern image which is the form different from the cover alignment pattern image 101 of FIG. 10A, respectively. In FIGS. 10B and 10C, the cover alignment pattern images 110 and 120 which are illustrated at the top thereof are not an image that is output through the flat panel display 11 of the mobile device 10 and which the user can see but a virtual image of the pattern image for the left eye and pattern image for the right eye formed by the cover setting program. The cover alignment pattern images 111 and 121 which are illustrated at the bottom thereof are three-dimensional cover alignment pattern images which the user can see through the 3D viewing cover 20.

If the user adjusts the cover alignment pattern images 101, 111, and 121 displayed on the flat panel display 11 of the mobile device 10, the values of the setting parameters of the cover alignment patterns are changed. For example, values of the slanted angle, the rendering pitch, the offset, etc., constituting the setting parameters are changed.

In the above description, a method of adjusting the values of the setting parameters by touching the cover alignment pattern image displayed on the flat panel display 11 of the mobile device 10 has been described. However, it is understood that the values of the setting parameters of the cover alignment patterns may be adjusted in different ways in one or more other exemplary embodiments. For example, the values of the setting parameters of the cover alignment patterns may be adjusted through a setting parameter changing screen.

Figure 11:
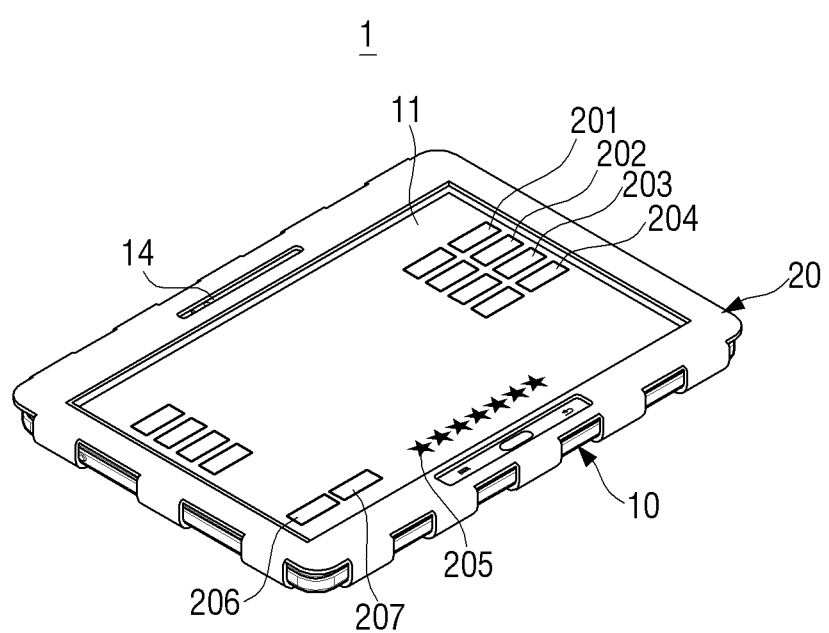
FIG. 11 is a view illustrating a setting parameter changing screen that can change setting parameters of a cover alignment pattern when performing a setting method of a glasses-free 3D display mobile device according to an exemplary embodiment.

FIG. 11 is a view illustrating a setting parameter changing screen through which values of setting parameters of cover alignment patterns may be changed when performing a setting method of a glasses-free 3D display mobile device 1 according to an exemplary embodiment.

Referring to FIG. 11, the setting parameter changing screen for the 3D viewing cover 20 may include a slanted angle setting button 201, a rendering pitch setting button 202, an offset setting button 203, a viewing distance setting button 204, a setting value display portion 205, a storing button 206, and a cancel button 207. If the user presses the slanted angle setting button 201, a setting value of the slanted angle is displayed in the setting value display portion 205. The user can set a desired setting value of the slanted angle by using the slanted angle setting button 201 and setting values being displayed in the setting value display portion 205. Also, a setting value of the rendering pitch may be set by using the rendering pitch setting button 202 and the setting value display portion 205. An offset setting value may be set by using the offset setting button 203 and the setting value display portion 205. The viewing distance may be set by using the viewing distance setting button 204 and the setting value display portion 205. Here, the viewing distance refers to the distance D between the mobile device 10 and the user's eyes. If the user presses the storing button 206, the setting values of the slanted angle, the rendering pitch, the offset, and the viewing distance that are set by the user are stored in the storage unit of the mobile device 10. The cancel button 207 is used when the user deletes the set values. After setting the setting parameters of the 3D viewing cover 20 as described above, the user can determine whether the setting parameters are input correctly by checking the cover alignment pattern image like the figure that is illustrated at the bottom of FIG. 10A.

After the adjustment of the cover alignment pattern image is completed, if the user presses the storing button 206 displayed on the flat panel display 11 of the mobile device 10, the cover setting program stores the setting parameters of the cover alignment patterns in the storage unit of the mobile device 10 (operation S860). The setting parameters of the cover alignment patterns that are modified and stored as described above are the setting parameters of the 3D viewing cover 20 that is suitably set to a particular user.

Furthermore, the values of the setting parameters of the 3D viewing cover 20 may vary with the body characteristics of the user. In particular, in the case of children, the values of the setting parameters may vary greatly in comparison with adults. Accordingly, even when other users use the same 3D viewing cover 20, the setting parameters of the 3D viewing cover 20 may be set on a per-user basis in order to view the optimized three-dimensional images.

Hereinafter, a user adding method of adding another user for a 3D viewing cover 20 of a glasses-free 3D display mobile device 1 according to an exemplary embodiment will be described with reference to FIG. 12.

Figure 12:
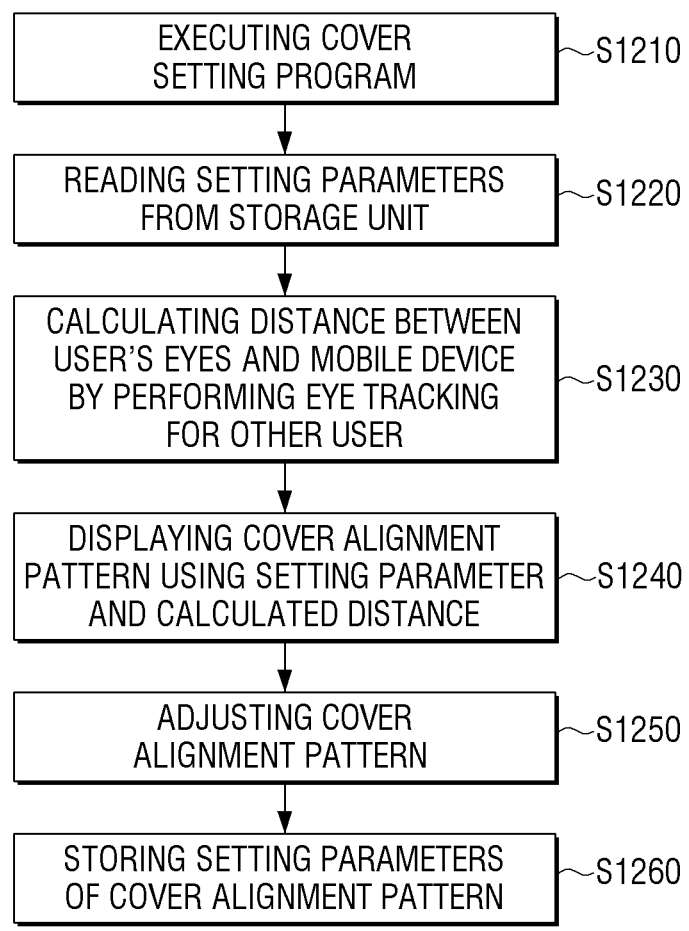
FIG. 12 is a flowchart illustrating a user adding method of adding a user to a glasses-free 3D display mobile device according to an exemplary embodiment after a 3D viewing cover is mounted onto the glasses-free 3D display mobile device.

FIG. 12 is a flowchart illustrating a user adding method of adding another user to use a 3D viewing cover of a glasses-free 3D display mobile device 1 according to an exemplary embodiment.

Referring to FIG. 12, if the 3D viewing cover 20 is mounted onto the mobile device 10, another user (e.g., other than a user that has previously executed the cover setting program) executes the cover setting program installed in the mobile device 10 (operation S1210). If the 3D viewing cover 20 is not mounted onto the mobile device 10, the user mounts the 3D viewing cover 20 onto the mobile device 10, and executes the cover setting program.

The cover setting program reads the setting parameters of the 3D viewing cover 20 stored in the storage unit of the mobile device 10 (operation S1220). After that, the cover setting program performs the eye tracking for the face of the other user and calculates the distance between the eyes of the other user and the mobile device 10 (operation S1230). The cover setting program may calculate the distance between the mobile device 10 and the eyes of the other user by performing the eye tracking in the same or similar manner as that of the setting method of the glasses-free 3D display mobile device 1 as described above.

After calculating the distance between the mobile device 10 and the eyes of the other user, the cover setting program generates a cover alignment pattern image using the setting parameters read in the storage unit of the mobile device 10 and the distance between the mobile device 10 and the eyes of the other user calculated in the previous operation, and outputs the cover alignment pattern image to the flat panel display 11 of the mobile device 10 (operation S1240). Then, the other user checks the displayed cover alignment pattern image to determine whether the separation of the pattern image for the left eye and the pattern image for the right eye is accurate, and whether crosstalk occurs. If the cover alignment pattern image that the other user views through the 3D viewing cover 20 is not seen clearly (e.g., is lines are disconnected), unlike the cover alignment pattern image as illustrated at the bottom of each of FIGS. 10A, 10B, and 10C, the user adjusts the cover alignment pattern image by, for example, touching the flat panel display 11 of the mobile device 10 (operation S1250).

After the adjustment of the cover alignment pattern image is completed, the other user stores the setting parameters of the cover alignment patterns in the storage unit of the mobile device 10 with a name or identifier that can be distinguished from setting parameters for the user that has already been set (operation S1260). The added other user can view the three-dimensional images using his or her stored setting parameters of the 3D viewing cover 20 at a later time.

As described above, the setting parameters are stored on a per-user basis according to the present exemplary embodiment. In this regard, there may be stored default setting parameters for any user for which specific setting parameters are not stored, in addition to setting parameters stored for specific users.

Hereinafter, a using method of a glasses-free 3D display mobile device 1 to view three-dimensional images according to an exemplary embodiment will be described in detail with reference to FIG. 13.

Figure 13:
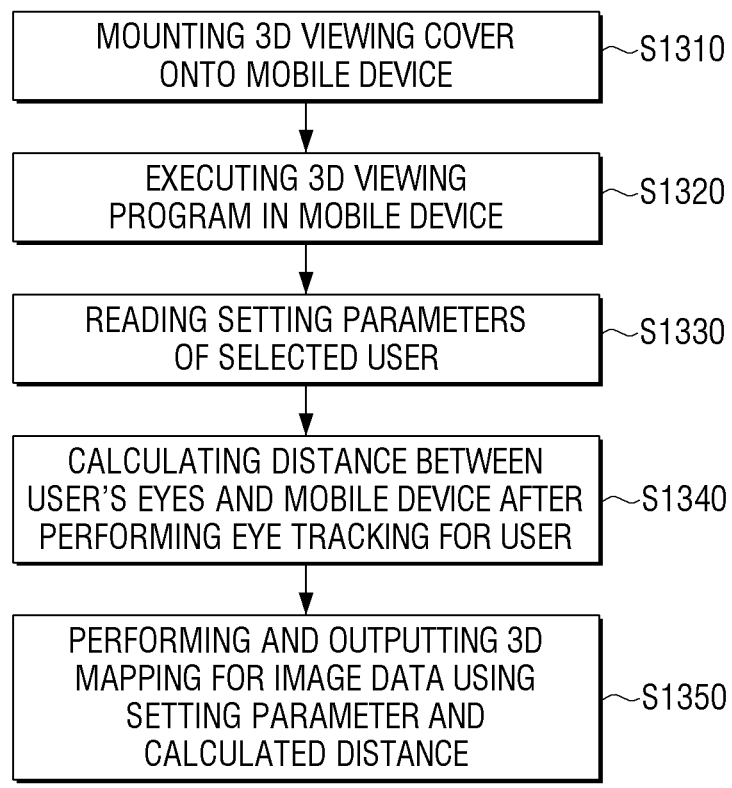
FIG. 13 is a flowchart illustrating a using method of a glasses-free 3D display mobile device according to an exemplary embodiment.

FIG. 13 is a flowchart illustrating a using method of a glasses-free 3D display mobile device according to an exemplary embodiment.

Referring to FIG. 13, a user mounts the 3D viewing cover 20 onto the mobile device 10 (operation S1310). Accordingly, the three-dimensional film 50 of the 3D viewing cover 20 is positioned on the top of the flat panel display 11 of the mobile device 10.

The user executes a 3D viewing program installed in the mobile device 10 (operation S1320). The 3D viewing program may be provided with the 3D viewing cover 20, and be configured to be installed in the mobile device 10 by the user, a service provider, a content provider, a manufacturer, etc.

In the operation of executing a 3D viewing program, the 3D viewing program displays a list of users that have stored the setting parameters of the 3D viewing cover 20 in the storage unit of the mobile device 10. Accordingly, the user selects his or her name from the list of users.

If the user is selected, the 3D viewing program reads the setting parameters of the selected user from the storage unit of the mobile device 10 (operation S1330).

The 3D viewing program controls the camera unit 14 of the mobile device 10 to perform eye tracking for the user's face, and calculates a distance between the mobile device 10 and the user's eyes (operation S1340).

The 3D viewing program performs 3D mapping for image data to be displayed by using the setting parameters of the selected user and the calculated distance between the mobile device 10 and the user's eyes. Subsequently, the 3D viewing program outputs the 3D mapped image data to the flat panel display 11 of the mobile device 10 (operation S1350).

Thus, the user can view three-dimensional images being displayed on the flat panel display 11 of the mobile device 10 through the 3D viewing cover 20.

If using the glasses-free 3D display mobile device 1 according to an exemplary embodiment as described above, the 3D viewing program outputs proper three-dimensional images by tracking the user's eyes through the eye tracking. Therefore, the user can view the optimized three-dimensional images at any location.

Also, with the glasses-free 3D display mobile device according to an exemplary embodiment, if the user initially sets the setting parameters of the 3D viewing cover only once, it is not necessary to reset the setting parameters of the 3D viewing cover when using the 3D viewing cover at a later time. Therefore, usage of the 3D viewing cover is convenient.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units or components of the above-described apparatuses and devices can include circuitry, a processor, a microprocessor, etc., and may execute a computer program stored in a computer-readable medium.

While exemplary embodiments have been described above, additional variations and modifications may be understood by those skilled in the art based on the present description. Therefore, it is intended that the appended claims shall be construed to include both the above exemplary embodiments and all such variations and modifications that fall within the spirit and scope of the inventive concepts.

What is claimed is:

1. A glasses-free three-dimensional (3D) display device comprising:
    a display device comprising a flat panel display; and
    a 3D viewing cover detachably disposed on the flat panel display, the 3D viewing cover configured to allow images displayed on the flat panel display to be viewed in three dimensions, the 3D viewing cover comprising a three-dimensional film in contact with a top surface of the flat panel display,
    wherein the display device comprises a cover setting program executable by the display device to set setting parameters of the 3D viewing cover,
    wherein the cover setting program is configured to display, on the flat panel display of the display device, a cover alignment pattern for changing one or more of the setting parameters of the 3D viewing cover, and
    wherein the cover setting program is configured so that, when the displayed cover alignment pattern is touched via user input to change the displayed cover alignment pattern and to change the one or more of the setting parameters of the 3D viewing cover, the one or more of the setting parameters of the 3D viewing cover are changed and a display of the cover alignment pattern on the flat panel display is changed.

2. The glasses-free 3D display device of claim 1, wherein the 3D viewing cover comprises:
    a cover frame configured to be coupled to the display device, the cover frame comprising an opening corresponding to the flat panel display in a center portion thereof;
    a buffer member around the opening on an inner surface of the cover frame;
    the three-dimensional film fixed to the inner surface of the cover frame by the buffer member, the three-dimensional film covering the opening; and
    a transparent plate between the cover frame and the three-dimensional film.

3. The glasses-free 3D display device of claim 2, wherein the 3D viewing cover further comprises a double-sided tape configured to fix the buffer member to the cover frame.

4. The glasses-free 3D display device of claim 2, wherein the 3D viewing cover further comprises a double-sided tape configured to fix the three-dimensional film to the buffer member.

5. The glasses-free 3D display device of claim 2, wherein:
the cover frame comprises at least one hole around the opening; and
the at least one hole is at a position corresponding to an image capturing device of the display device.

6. The glasses-free 3D display device of claim 2, wherein:
when the 3D viewing cover is mounted on the display device, the buffer member is compressed in a thickness direction of the buffer member; and
when the 3D viewing cover is separated from the display device, a thickness of the buffer member is expanded and restored to an original thickness.

7. The glasses-free 3D display device of claim 6, wherein:
the cover frame comprises a fastening portion detachably coupled to the display device; and
a distance between a leading end of the fastening portion and the three-dimensional film is less than a thickness of the display device.

8. The glasses-free 3D display device of claim 2, wherein the 3D viewing cover further comprises a secondary buffer member between the cover frame and the transparent plate.

9. The glasses-free 3D display device of claim 1, wherein the 3D viewing cover is coupled to the display device by an elastic force.

10. The glasses-free 3D display device of claim 1, wherein the setting parameters of the 3D viewing cover comprise a slanted angle, a rendering pitch, and an offset of the three-dimensional film.

11. A three-dimensional (3D) viewing cover for a display device configured to allow images displayed on the display device to be viewed in three dimensions, the 3D viewing cover comprising:
a cover frame configured to be coupled to the display device, the cover frame comprising an opening corresponding to a display panel in a center portion thereof;
a buffer member provided around the opening of the cover frame on an inner surface of the cover frame;
a three-dimensional film distinct from the cover frame and fixed to the inner surface of the cover frame by the buffer member, the three-dimensional film covering the opening; and
a transparent plate provided inside the buffer member and between, along a direction perpendicular to a display area of the display panel, the cover frame and the three-dimensional film, the transparent plate being distinct from the display panel and the display device,
wherein the 3D viewing cover is detachable from the display device.

12. The 3D viewing cover of claim 11, further comprising a double-sided tape configured to fix the buffer member to the cover frame.

13. The 3D viewing cover of claim 11, further comprising a double-sided tape configured to fix the three-dimensional film to the buffer member.

14. The 3D viewing cover of claim 11, wherein:
the cover frame comprises at least one hole around the opening; and
the at least one hole is at a position corresponding to an image capturing device of the display device.

15. The 3D viewing cover of claim 11, wherein:
when the 3D viewing cover is mounted on the display device, the buffer member is compressed in a thickness direction of the buffer member; and
when the 3D viewing cover is separated from the display device, a thickness of the buffer member is expanded and restored to an original thickness.

16. The 3D viewing cover of claim 15, wherein:
the cover frame comprises a fastening portion detachable to the display device; and
a distance between a leading end of the fastening portion and the three-dimensional film is less than a thickness of the display device.

17. The 3D viewing cover of claim 11, further comprising a secondary buffer member between the cover frame and the transparent plate.

* * * * *